United States Patent
Lammers et al.

(10) Patent No.: US 11,134,691 B2
(45) Date of Patent: Oct. 5, 2021

(54) FOAMED, DOUGH-BASED FOOD AND APPARATUS AND METHOD FOR PRODUCTION THEREOF AND USE OF THE APPARATUS

(71) Applicants: Eidgenössische Technische Hochschule Zürich, Zürich (CH); Roland Murten AG, Murten (CH)

(72) Inventors: Volker Lammers, Zürich (CH); Erich Windhab, Hemishofen (CH)

(73) Assignees: EIDGENÖSSISCHE TECHNISCHE HOCHSCHULE ZÜRICH, Zürich (CH); Roland Murten AG, Murten (CH)

( * ) Notice: Subject to any disclaimer, the term of this patent is extended or adjusted under 35 U.S.C. 154(b) by 0 days.

(21) Appl. No.: 15/775,494

(22) PCT Filed: Nov. 11, 2016

(86) PCT No.: PCT/EP2016/077462
§ 371 (c)(1),
(2) Date: May 11, 2018

(87) PCT Pub. No.: WO2017/081271
PCT Pub. Date: May 18, 2017

(65) Prior Publication Data
US 2018/0317501 A1 Nov. 8, 2018

(30) Foreign Application Priority Data
Nov. 12, 2015 (DE) ...................... 10 2015 119 543.7
Jun. 23, 2016 (DE) ...................... 10 2016 111 518.5

(51) Int. Cl.
A21D 8/02 (2006.01)
A21C 11/20 (2006.01)
(Continued)

(52) U.S. Cl.
CPC .............. *A21D 8/025* (2013.01); *A21C 1/006* (2013.01); *A21C 1/065* (2013.01); *A21C 1/10* (2013.01);
(Continued)

(58) Field of Classification Search
USPC .................................................. 426/498, 496
See application file for complete search history.

(56) References Cited

U.S. PATENT DOCUMENTS

| 48,534 A | 7/1865 | Dauglish |
| 5,120,559 A | 6/1992 | Rizvi et al. |

(Continued)

FOREIGN PATENT DOCUMENTS

WO 2015180706 A2 12/2015

OTHER PUBLICATIONS

International Search Report dated Dec. 7, 2016 for PCT/EP2016/077462 filed Nov. 11, 2016.
(Continued)

*Primary Examiner* — Lien T Tran
(74) *Attorney, Agent, or Firm* — Paul D. Bianco; Stephen Bongini; Fleit Intellectual Property Law

(57) ABSTRACT

A dough-based food product, an apparatus and method for production of the dough-based food product. A food product matrix to be foamed includes a proportion by weight of a starch-containing raw material and a proportion by weight of water. Gas that has been dissolved or is to be dissolved is introduced into the food product matrix to be foamed. The gas is dissolved under pressure in the food product matrix to be foamed. Gas bubbles are formed by expansion and increasing the volume with a resulting reduction in density of the dough as a result of bubble growth for formation of a foamed food product matrix of the food product to be produced. The foam is then stabilized. Gas is introduced into (Continued)

and dissolved in the aqueous component of the food product matrix to be foamed in a subcritical state below the critical point and at a pressure of 10 bar≤p<critical pressure of the gas.

16 Claims, 5 Drawing Sheets

(51) Int. Cl.
    *A21D 13/066*    (2017.01)
    *A21D 13/50*    (2017.01)
    *A21C 1/06*    (2006.01)
    *A21C 1/10*    (2006.01)
    *A23L 7/17*    (2016.01)
    *A23P 30/20*    (2016.01)
    *A23P 30/34*    (2016.01)
    *A23L 7/178*    (2016.01)
    *A21C 1/00*    (2006.01)
    *A21C 14/00*    (2006.01)
(52) U.S. Cl.
    CPC ............... *A21C 11/20* (2013.01); *A21C 14/00* (2013.01); *A21D 13/066* (2013.01); *A21D 13/50* (2017.01); *A23L 7/17* (2016.08); *A23L 7/178* (2016.08); *A23P 30/20* (2016.08); *A23P 30/34* (2016.08)

(56) References Cited

U.S. PATENT DOCUMENTS

| | | | |
|---|---|---|---|
| 5,417,992 | A | 5/1995 | Rizvi et al. |
| 5,549,922 | A | 8/1996 | Juchem |
| 6,207,214 | B1 | 3/2001 | Kim |
| 2004/0199492 | A1* | 10/2004 | Maniak .................. A21D 8/025 |

OTHER PUBLICATIONS

Written Opinion for PCT/EP2016/077462 filed Nov. 11, 2016.
Massey et al, Air Inclusion Into a Model Cake Batter Using a Pressure Whisk: Development of Gas Hold-up and Bubble Size Distribution, Journal of Food Science, Oct. 28, 2001, vol. 66, No. 8, p. 1152-1157.
Elgeti et al, Strategies for the aeration of gluten-free bread—A review, Trends in Food Science & Technology 46 (2015) p. 75-84.
International Preliminary Report on Patentability and Written Opinion for PCT/EP2016/077462 filed Nov. 11, 2016.

* cited by examiner

FOAMED, DOUGH-BASED FOOD AND APPARATUS AND METHOD FOR PRODUCTION THEREOF AND USE OF THE APPARATUS

TECHNICAL FIELD

The present invention relates to foamed, dough-based food products and to methods and apparatuses for the production of the dough-based food products.

The foamed dough-based food products according to the invention can contain gluten, but relate in particular to gluten-free fresh baked goods and long-life baked goods.

PRIOR ART

Traditionally, the production of baked goods is divided into the processing steps of dough preparation, dough loosening and baking.

It is well-known that the dough components flour, water, yeast or microorganisms, respectively, and salt, interact with one another in response to the production of fresh baked goods on the basis of grain products containing gluten (wheat, rye) and form the three-dimensional gluten framework. The loosening of the doughs mostly occurs biologically-biochemically by means of yeast-induced gas formation and provides the dough with the desired liquid-gas-solid structure. The gas retention properties of the dough trace back to the gluten framework and provide the pastry with the characteristic crumb structure and a flavorful sensory overall impression. In response to baking, a thermal change of state of the ingredients and a conversion of the dough to a pastry of crumbs and crust occurs.

The optimal volume of pastries is a function of equilibrium conditions between gas formation intensity and gas retention capacity.

Due to the fact that the so-called gluten framework is missing in the case of gluten-free baked goods, the capacity of these doughs to retain formed gas is also reduced significantly. During the fermentation, formed gas is lost and/or leads to a coarsening of the bubble structure or porosity by means of coalescence. Disadvantageous quality features result from this for the finished pastry, such as a reduced baking volume, a dense and firm structure, as well as an unappetizing appearance. In summary, the difficulty in the development of gluten-free baked goods lies in creating a high pastry volume in combination with a soft texture and a fine pore structure.

Currently known strategies for the optimization of gluten-free baked goods focus on formulation-technological measures for finding a protein replacement, which is as equivalent as possible. Recipes for the production of gluten-free baked goods are often based on starch-containing raw materials, such as rice flour and different types of starch. Due to the reduced baking properties of these components, an increased use of emulsifiers, hydrocolloids and other additives is often also necessary. The research efforts have led to texture and structure improvements, but without being able to completely compensate the functionality of the gluten. The success of purely recipe-oriented improvement measures is limited as a result of the fundamentally different material properties of gluten-containing and gluten-free doughs. From this aspect, the adherence to the traditional processing steps, in particular the dough loosening, is also not helpful.

In addition to the classical yeast loosening, loosenings with sourdough or raising agents are widespread in the field of fresh baked goods. In the case of puff pastries, however, this is referred to as a physical loosening, because the loosened pore structure is created during the baking process as a result of evaporated water.

The direct fold-in or incorporation of gases, respectively, in dough-like masses shall be mentioned as further method for loosening baked goods. This method is mostly used in the case of low-viscous dough or biscuit masses, respectively, based on a mixture of beaten egg whites, egg yolk, sugar and flour, wherein the flour components play a minor role. Due to the higher dough viscosity, this method is not suitable for the production of fresh baked goods.

Further methods for loosening doughs can be found in the patent and scientific literature beyond the mentioned traditional loosening types. However, they are mostly also designed for gluten-containing dough systems and thus require an increased gas retention capacity.

First efforts for foaming doughs were based on the idea of avoiding long fermentation times, so as to design the production process more efficiently. By directly incorporating gas into the dough, the long gas formation by means of yeast was to become superfluous. In 1865, a patent (U.S. Pat. No. 48,534) was already granted, which provides for the dough production in a closed kneading machine, in which carbonic acid or another gas is incorporated into a dough under high pressure. In other words, the gas used in this known production process is dispersed or distributed as finely as possible, respectively, into the dough. A subsequent relaxation ensures an expansion of the gases and a volume increase of the dough. The relaxation, however, can only be monitored or controlled, respectively, with difficulty by means of this known production process, which is disadvantageous in particular in the case of doughs with low gas retention capacity.

The basic idea of kneading doughs under pressure or vacuum was pursued, because, in addition to the volume, the size and distribution of the gas bubbles and thus the later pore structure in the pastry is influenced in an advantageous manner.

A selective control of the gas bubble distribution in the dough and the crumb structure was accelerated in 1961 in England by means of a new kneader development. The dough components are mixed together under a partial vacuum in a kneader in the so-called Chorleywood method. The structure in the pastry can thus be influenced selectively up to a finer porosity.

Inventions based on extrusion technology are known in the field of the continuous processes. An extrusion method is described in the patent U.S. Pat. No. 5,417,992 (Rizvi), in which overcritical carbon dioxide ($CO_2$) is mixed or injected, respectively, into a dough matrix, whereupon the used carbon dioxide ($CO_2$) is present in a dissolved form under pressure in the aqueous portion of the dough matrix. For the overcritical state of carbon dioxide ($CO_2$), pressures of >73.75 bar and temperatures of >30.98° C. are necessary.

An extrusion method, in which carbon dioxide ($CO_2$) is injected as overcritical fluid under pressure into a gluten-containing dough matrix located in the extruder, is also known from U.S. Pat. No. 5,120,559 (Rizvi).

In the case of overcritical fluids, the phase boundary between liquid and gaseous state disappears. The fluid adopts the density of the liquid and the viscosity of the gas. This combination ensures a high dissolving capacity and a complete disappearance in response to pressure reduction. The disadvantage when using an overcritical fluid and the resulting extreme process conditions lies in the selection of a suitable equipment, which has as little wear as possible, and the nonetheless high maintenance effort.

All of the mentioned methods refer primarily to gluten-containing dough systems. It is required thereby that the doughs have material properties, which are comparable to gluten-containing doughs (rheological behavior, firmness) and a high gas retention capacity. Disadvantageously, an explicit use, which ensures a desirable porosity, even for dough-based food products comprising a low gas retention capacity, such as, for example, gluten-free doughs, is thus currently not known from the prior art.

SUMMARY OF THE INVENTION

One aspect of the present invention relates to a foamed, dough-based food product on the basis of gluten-free powder components and/or flour components and liquid, in particular water, as well as an apparatus and a method for the reproducible production of the foamed, dough-based food product, which overcomes the described disadvantages of conventionally produced/loosened dough and which is suitable for baked goods, which meet high demands on volume, appearance and structure, regardless of the gas retention capacity, and which in particular make lower demands on the equipment and the maintenance, in particular in response to the production.

A dough-based food product as well as an apparatus and method for the production of the dough-based food product according to the invention are disclosed herein.

The present invention relates to a method for the production of a foamed, dough-based food product, wherein the foam structure of the doughs is produced via a novel foaming process, which can essentially be divided into the steps of gas dissolution, gas bubble nucleation or gas bubble formation, respectively/foam formation and foam stabilization.

The method according to the invention comprises the method steps of:
a) providing a food product matrix to be foamed, comprising a proportion by weight of a starch-containing raw material and a proportion by weight of water,
b) introducing a gas that is to be dissolved or has been dissolved into the food product matrix to be foamed,
c) dissolving the gas under pressure in the food product matrix to be foamed,
d) forming gas bubbles by pressure relaxation and increasing the volume with a resulting reduction in density of the dough as a result of bubble growth for formation of a foamed food product matrix of the food product,
e) stabilizing the foam of the foamed food product matrix to attain the food product according to the invention.

According to the invention, the method comprises in method step b) a pre-enrichment of the doughs or an introduction into the dough, respectively, and in method step c) a dissolving with a gas in the subcritical state below the critical point and at a pressure of 10 bar$\leq$p<critical pressure of the gas. It turned out that the pressures between method step b) and c) remain substantially constant and can only vary within a small range of 5 bar.

In method step b), carbon dioxide ($CO_2$) is particularly preferably introduced as gas at pressures of 25<p$\leq$65 bar and at a temperature of<31° C. It turned out that the gas, which is introduced in this preferred, subcritical range below the critical point, still ensures a desirable solubility in the aqueous portion of the food product matrix to be foamed (because $CO_2$ is typically present in the liquid phase in these pressure and temperature ranges).

As an alternative to carbon dioxide ($CO_2$), nitrous oxide ($N_2O$) in the subcritical state is used as gas in method step b), whereby nitrous oxide ($N_2O$) is preferably introduced at pressures of 10$\leq$p<72.4 bar (i.e. <the critical pressure of $N_2O$) and at a temperature of <36.4° C.

In the alternative or in addition, it is furthermore conceivable that the gas is introduced in an already dissolved manner in a dispersion under subcritical conditions in method step b).

Advantageously, it was found that the increased, desirable dissolvability of the gases under pressure leads to the gas bubble nucleation and formation of foam at a pressure reduction or re-relaxation, respectively, wherein the pore structure can be adjusted by means of a selective re-relaxation.

A simplified equipment, which can be maintained more easily, can furthermore be used to carry out the method according the invention, and the safety requirements are also lower in the case of the use according to the invention of a gas in the subcritical range as compared to the known use of an overcritical gas.

In terms of the present invention, a gas in the subcritical state is furthermore understood in such a way that, on the one hand, the used gas lies below the point, which is thermodynamically critical for the used gas. It is known that the critical point is characterized by one of the three status variables: critical temperature, critical pressure, critical density.

In method step c), the gas is dissolved in the subcritical state in the dough matrix according to a preferred further development of the present invention at a defined, suitable combination of shear, temperature, dwell time and pressure, preferably for carbon dioxide ($CO_2$) as used gas at pressures of preferably 10 bar$\leq$p<73.8 bar (i.e. <the critical pressure of ($CO_2$), more preferably 25 bar$\leq$p<65 bar and at a temperature of<31° C. Due to such a combination, it is ensured that the specified amount of gas is in fact present in a dissolved and not in a dispersed state within a very short time.

As alternative to carbon dioxide ($CO_2$), noxious gas ($N_2O$) can be dissolved as gas in method step c) in the subcritical state at pressures of preferably 10 bar$\leq$p<72.4 bar (i.e. <the critical pressure of $N_2O$) and a temperature of <36.4° C.

In method step c), a dwell time of preferably between 30s and 300s, more preferably of between 80s and 200s, most preferably of between 100s and 150s, is furthermore adjusted.

Advantageously, the specified amount of gas (mass) is selected in such a way that the density or the degree of loosening, respectively, of the foam can be adjusted selectively. In method step b), the used amount of gas is preferably adjusted to between 0.05 and 1.5% by weight, based on the food matrix to be foamed.

A pressure drop, which is adjusted subsequently, in method step d) preferably via a nozzle or a pressure-controlled valve, ensures a nucleation of the gas bubbles, wherein a quick pressure drop in combination with a high shear leads to an increased nucleation rate. Preferably, a pressure drop rate of>60 bar/min is adjusted in method step d).

Due to the fact that a long-lasting fermentation is not necessary in the case of this process, the foam destabilization of the foamed, dough-based food product attained in method step d) is minimized in that the foamed dough is solidified directly in the baking oven in a subsequent method step e). It is thus made possible in an advantageous manner that for pastries, which are attained from low-viscous dough foams (more susceptible to foam destabilization), for example bread, a fine porosity can be attained as well. In the alternative, it is conceivable that a foam stabilization of the foamed, dough-based food product attained in method step d) is attained in method step e) by means of quick-freezing.

It turned out that the pastry volume of such gluten-free baked goods is largely independent from the material (rheology) and gas retention properties (gluten) of the dough.

It is possible by means of the method according to the invention to produce gluten-free, micro-foamed doughs, which positively influence the properties of the finished baked good with regard to volume, texture and pore structure.

A further aspect of the present invention relates to an apparatus for carrying out the method according to the invention for the production of a foamed, dough-based food product.

The apparatus according to the invention comprises at least one device suitable to prepare dough for the production of a dough-based food product matrix to be foamed as well as a supply device for supplying a gas into the dough-based food product matrix to be foamed.

According to the invention, the apparatus is embodied in such a way that gas can be introduced into the aqueous portion of the food matrix to be foamed in a subcritical state below the critical point at a pressure of 10 bar$\leq$p<critical pressure of the gas by means of the supply device, and that a dissolving of the introduced gas in a subcritical state below the critical point can be adjusted in the apparatus at a pressure of 10 bar$\leq$p<critical point of the gas for attaining a foamed, dough-based food product.

Further advantageous embodiments are also disclosed.

The device, which is suitable to prepare dough, is preferably an extruder, in particular a twin-screw extruder. As an alternative to an extruder, the device, which is suitable to prepare dough, can be a batch kneader.

A continuous production process can be attained in an advantageous manner by means of an extruder as device for the preparation of dough for carrying out method steps a) to d). In other words, the method steps a) to d) can be carried out in series by means of an extruder.

Particularly preferably, the extruder comprises at least one screw configuration embodied in this way, which, in addition to the common conveying elements, comprises additional, suitable kneading and mixing elements. Due to such kneading and mixing elements, the gas to be dissolved is advantageously introduced particularly well into the food product matrix to be foamed in the subcritical state and the dissolution of the gas in method step c) is thereby shortened in an advantageous manner. Particularly preferably, the mixing elements are embodied in such a way that a distributive mixing is attained in the food product matrix in response to the dissolution of the gas.

According to a preferred further embodiment, the apparatus according to the invention comprises a nozzle or a valve, which are embodied to ensure a pressure drop rate of >60 bar/min.

In terms of the present invention, such a used nozzle is arranged on the end side of the extruder and is embodied and selected on the one hand to provide for a pressure regulation in the extruder as a function of the dough viscosity and dough density, as well as on the mass flow rate. On the other hand, the nozzle is embodied in such a way that a selective relaxation and gas bubble formation is attained. An increased shear in response to the relaxation ensures an increased formation of gas bubbles. A large number of bubbles at the beginning of the foaming is significant for a subsequent, even porosity in the pastry.

It was found to be particularly advantageous that overcritical conditions with the corresponding disadvantageous maintenance effort as a result of an intensive mixing by selecting suitable mixing elements, combined with a sufficiently long dwell time and a selective relaxation by means of a nozzle or a valve can be avoided by means of the apparatus according to the invention.

A further, preferred embodiment of the apparatus according to the invention can be provided by means of a pressure-tight container as suitable device for the preparation of dough, in which the powder and liquid components for forming a dough-based food product matrix to be foamed are filled in the desired mixing ratio. A dough is formed by means of shaking and a dough/gas mixture results in the container in terms of a food product matrix to be foamed of the food product to be produced by adding gas, introduced via gas cartridges in terms of a supply device, preferably at a pressure within a lower range of 15 bar, wherein the gas is dissolved in a subcritical state in the aqueous dough portion. When the food product matrix to be foamed escapes from the pressure-tight container, a gas bubble formation is induced as a result of the pressure relaxation.

A relaxation nozzle is preferably arranged in an escape area, which is designated for the escape of the food matrix, of the pressure container, which is pressure-tight, or which can be closed in a pressure-tight manner, respectively, to attain a pressure relaxation and thus for the formation of a foamed food product matrix.

Typically, the further, preferred embodiment is a cream maker, for example of the type Kisag Bläser Castro, and thus a non-industrial application. The used gas cartridges can be, for example, Kisag capsules, which are filled with carbon dioxide ($CO_2$) and/or nitrous oxide ($N_2O$).

It turned out in an advantageous manner that this further, preferred embodiment comprising a pressure container, which is pressure-tight, or which can be closed in a pressure-tight manner, respectively, is particularly suitable as device, which is suitable to prepare dough, for the preparation of dough, in particular for low-viscous, gluten-free doughs. This further, preferred embodiment can furthermore be used non-industrially in an advantageous manner in the kitchen scale.

A further aspect of the present invention relates to a dough-based food product comprising at least one proportion by weight of a flour of a raw material containing at least a starch as well as a proportion by weight of water, produced by means of the method according to the invention and the apparatus according to the invention.

In terms of the present invention, a dough-based food product is understood to be a composition, which comprises at least a flour of at least one starch-containing raw material, water. The dough-based food product according to the invention can furthermore comprise glucose, guar, salt, sugar, carboxymethyl cellulose, etc.

Surprisingly, it was found that the dough-based food product according to the invention unexpectedly has a particularly fine porosity as compared to the dough products, which are attained by means of the known production methods. In addition, it was found in an advantageous manner that attaining a desired volume and porosity in the case of the food product foamed according to the invention is largely independent from the gas retention properties and material properties, such as the viscosity of the dough.

In other words, it can be attained in an advantageous manner in the case of the food product foamed according to the invention that a desired volume and a desired porosity can be attained in particular also in the case of gluten-free, dough-based food products with reduced gas retention properties.

It was furthermore found that the food product according to the invention is suitable for long-life baked goods, such as for example snack products, of typically highly viscous doughs, as well as for fresh baked goods, such as for example bread, of typically low-viscous doughs.

A process-technological compensation of the gluten functionality was advantageously found for the production of gluten-free baked goods, which are comparable to gluten-containing baked goods in volume, texture and pore structure.

As described in detail, additives, such as, e.g., hydrocolloids and emulsifiers, have to typically be added in the case of gluten-free, dough-based food products, to compensate the resulting, reduced gas retention properties. Due to the fact that volume and porosity of the food product according to the invention are largely independent from the gas retention properties, a reduction of such additives can furthermore be attained in an advantageous manner.

In terms of the present invention, a highly viscous dough is understood to be a dough with a viscosity of between 100 and 1.000 Pascal seconds (Pas) (for example a snack dough) at 25° C. and a low-viscous dough is understood to be a dough with a viscosity of smaller than 100 Pascal seconds (Pas) at 25° C. (for example a bread dough).

In terms of a preferred further development, additives can furthermore be understood to be enzymes, thickeners, emulsifiers, fats or egg-based additives.

A flour of a starch-containing raw material can be understood, for example, to be gluten-free rice four, cereal flour, buckwheat flour, etc.

On principle, it is conceivable that the dough-based food product furthermore comprises a proportion by weight of yeast. The dough-based food product according to the invention, however, can preferably be produced without yeast. By forgoing an addition of yeast and a fermentation step associated therewith, the food product according to the invention can advantageously be provided in a shortened production process.

The idea of the compensation of disadvantageous quality features, such as reduced baking volume, structure, which is too dense and too firm, as well as an uneven pore distribution in the case of gluten-free baked goods and long-life baked goods as a result of such a selective pre-foaming of the dough prior to the baking process is new.

A further aspect of the present invention relates to a use of the apparatus according to the invention for carrying out the method according to the invention to attain a foamed, dough-based, in particular gluten-free food product.

BRIEF DESCRIPTION OF THE DRAWINGS

A preferred exemplary embodiment of the subject matter of the invention will be described below in connection with the enclosed drawings.

DETAILED DESCRIPTION OF THE INVENTION

Figure 1:
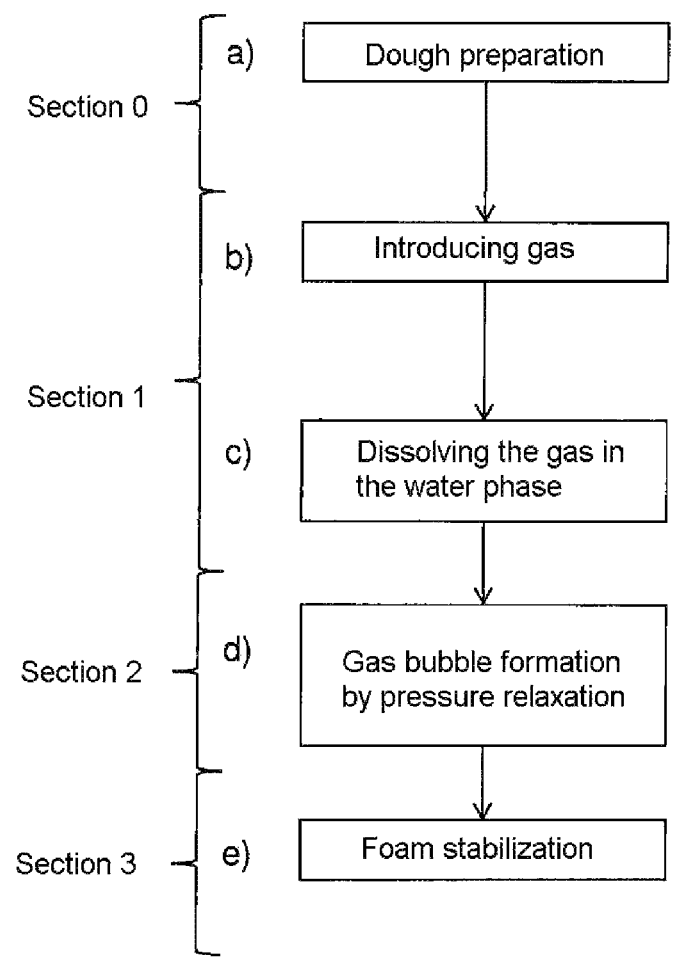
FIG. 1 shows a schematic illustration of the method steps for the production of the foamed, dough-based food product according to the invention.

FIG. 1 shows a schematic illustration of the method steps for the production of the foamed, dough-based food product according to the invention according to a particularly preferred method according to the invention. The compressed gas foaming according to the invention of gluten-free doughs substantially consists of the three steps of (i) gas dissolution, (ii) bubble nucleation/foam formation, and (iii) foam stabilization under moderate pressure and temperature conditions in the subcritical range.

In section 0, a provision of a dough-based food product matrix to be foamed, comprising a proportion by weight of starch-containing raw material as well as a proportion by weight of water, i.e. the actual dough preparation, takes place in a method step a).

In section 1, the introduction for example of carbon dioxide as gas in the subcritical state takes place in a method step b) and the dissolution of a gas under pressure in a dough matrix takes place in a subsequent method step c). The pressure, the type of gas, the temperature, the dough characteristic (viscosity) and the mixing are relevant for the kinetics of the dissolving process, as will be described below using the example of a fresh baked good as well as a long-life baked good. It is significant for the foam quality that the desired amount of gas does in fact dissolve. A pure dispersion or fine distribution, respectively, of the gas in the dough is not sufficient, because this would lead to an uneven gas bubble distribution in the dough foam. This is an essential difference as compared to applications, in which gas/air is mechanically folded and distributed into dough masses.

According to the invention, the dissolving process of the gas in method step c) takes place under pressure, but in the subcritical range (e.g. in the case of carbon dioxide: p<73.8 bar/T<+31° C.). The advantage in the case of subcritical conditions is that high pressures are not necessary with lower wear of the apparatus components and that less effort has to be expended for safety measures.

The dissolving of gases in static material systems is a diffusion-controlled process. On principle, the diffusion of a gas into a dough matrix can be approximated as follows as a function of temperature, pressure and gas concentration:

$$D = D_0 \exp(-\Delta E_D / R\, T) \text{(diffusion coefficient in solids)}$$

wherein D is the diffusion coefficient, $D_0$ is the diffusion constant, and $\Delta E_D$ is the activation energy for the diffusion of a gas into a dough matrix.

Due to the fact that diffusion is a very slow process, the dissolving of gases would take a very long time in a static system. In contrast, a method is described in the present invention, in which gas is dissolved in a dough matrix within a short period of time, so that the application is relevant for industrial processes. This is why, in addition to the diffusion, an additional convective material transport takes place in method step c) by means of an additional intensive mixing of the gas with the dough material. The duration of the dissolving of the gas is reduced significantly through this.

Due to the fact that gluten-free doughs often have an increased water portion and a lower viscosity as compared to gluten-containing doughs, the dissolution rate of the gas is increased in the cases of gluten-free doughs in a particularly advantageous manner and the desired amount of gas can dissolve more quickly.

The amount of gas to be dissolved depends on the desired degree of loosening of the baked good and preferably lies between 0.05 and 1.5% by weight (percent by weight), particularly preferably is 0.5% by weight.

In section 2 for method step d), the nucleation of gas bubbles and the formation of a dough foam structure associated therewith occur by means of selective pressure drop. A special role is assigned to this section, because after the complete relaxation, the structure is mainly responsible for the textural and sensory properties of the final product. The key to a finely distributed foam structure lies in a high nucleation rate (#/s), i.e. in the formation of many gas bubbles/cells within a short period of time. To be able to control the nucleation in a selective manner, it is preferred to embody the apparatus according to the invention in such a way that the gas type, the amount of gas, the pressure difference, the pressure drop rate, the viscosity and the shear can be adjusted. A tailored pressure drop takes place in method step d) through a nozzle or a pressure-controlled valve. On principle, a sudden pressure drop effects an intensive gas bubble nucleation, but it must be ensured as a function of the amount of gas and the dough viscosity that the dough matrix does not tear.

According to method step e), section 3 provides for the foam stabilization or the solidification, respectively, of the foam structure by means of thermal coagulation or gelatinization, respectively, of the pore walls as a result of structural changes of the polymeric egg white and starch molecules, for example at a temperature in the range of 200°. In other words, the pre-foamed structure is solidified by means of a subsequent baking process by means of the input of thermal energy.

In section 3, a preferred embodiment of the invention provides for the filling of the attained dough foam into baking molds.

The solidification preferably takes place immediately after the foam production, because longer interims between foaming and solidification can lead to a breakdown of the structure or to a coarsening of the foam structure, because the dough foams are thermodynamically unstable material systems.

The temperature/time combinations can be chosen similarly as in the case of the traditional production. In the case of highly low-viscos and highly foamed doughs, higher temperatures are preferred. No further foam destabilization or change of the gas bubble structure, respectively, takes place after the solidification.

Figure 2:
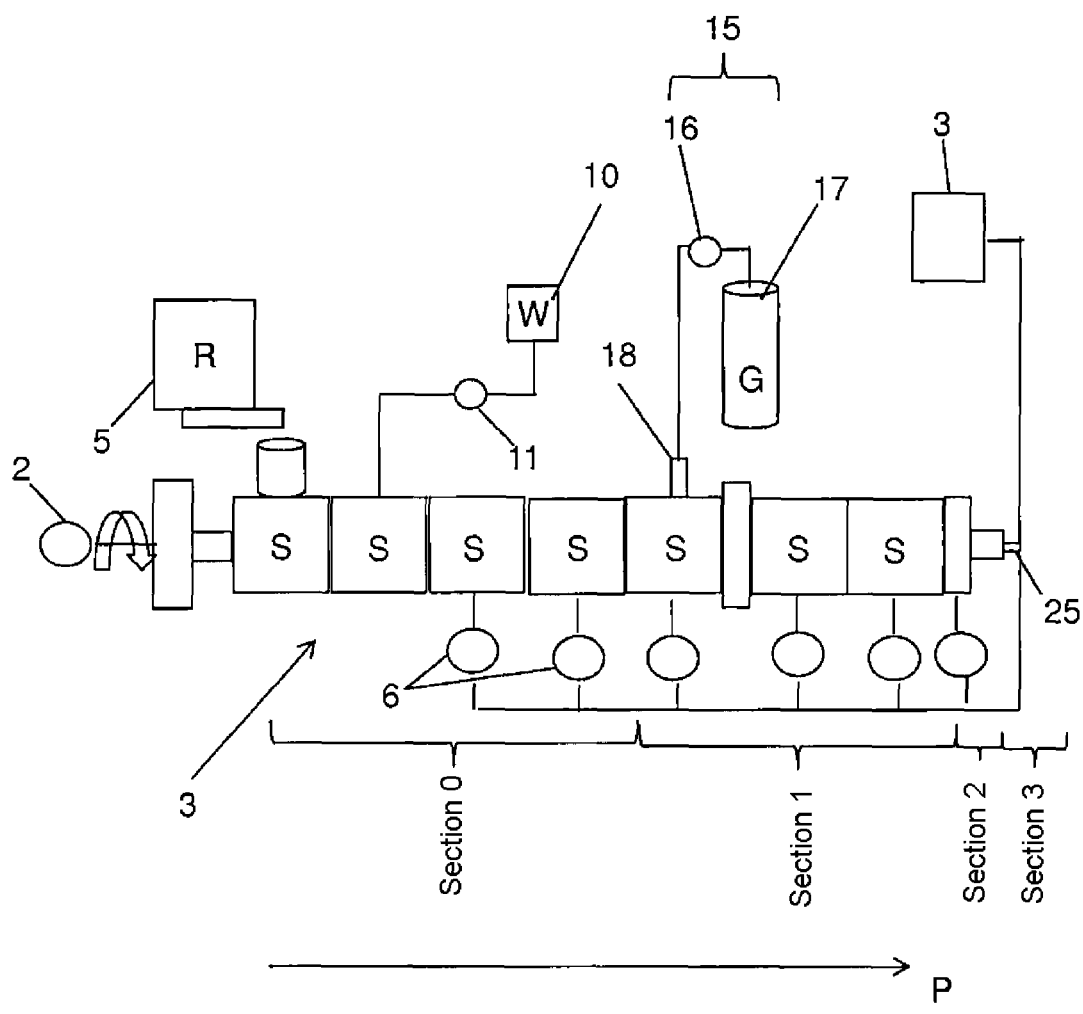
FIG. 2 shows a schematic setup of a preferred embodiment of the apparatus according to the invention for the continuous production of the food product according to the invention by means of an extruder.

FIG. 2 shows a preferred embodiment of the apparatus according to the invention for carrying out the method according to the invention described in FIG. 1.

According to the preferred embodiment of the invention, the gas dissolution takes place in section 1, the relaxation at a nozzle 25 on the end side to an extruder 3 takes place in section 2, and the foam stabilization in a baking oven takes place in section 3 (not shown in FIG. 2).

According to the invention, overcritical conditions can be avoided in an advantageous manner as a result of an intensive mixing, combined with a sufficiently long dwell time in the apparatus according to the invention and as, a result of a selective relaxation through a nozzle or a valve.

As limitation to the method according to the invention and the apparatus according to the invention, the U.S. patents (Rizvi) only consider overcritical gases, namely overcritical $CO_2$. It is not disclosed, however, to what extent the gas is dissolved in the dough matrix. The bubble formation is also not discussed in more detail. Here, the dissolving of gas occurs exclusively via the use of pressure. The dwell time of the gas and the conditions of the mixing and of the relaxation are not considered. Only conveying elements are used.

Convection plus diffusion can be implemented effectively in an advantageous manner in an extruder, which is why an enrichment of the doughs with gas preferably takes place in an extruder 3 as shown in FIG. 2.

The extruder 3 shown in FIG. 2 is divided into individual segments (S) or treatment zones, respectively. In section 0, a supply device 5 for supplying starch-containing raw material R, is arranged at the beginning of the process line P. A supply device 10 for supplying water W is furthermore arranged downstream in the direction of the process line P.

One temperature control device 6 is in each case operatively connected per segment in the segments S downstream from the supply device 10, wherein the temperature control devices 6 can be controlled via a control unit 3. In the method according to the invention, temperature control devices are preferably adjusted to a temperature in the range of between 20° C. and 30° C.

In section 1 of the process line, FIG. 2 shows a supply device 15 for supplying the gas to be dissolved. The mass flow of the gas significantly influences the dough density and thus also the pastry volume. The dough density can be adjusted selectively by means of the regulation with a suitable flow valve 16 for gases.

Only as much gas as can in fact be dissolved in the dough, should ideally be metered out. An excess of gas would lead to the intensification of blow-by effects and to the formation of unwanted large cavities in the dough foam matrix. This would result in a coarse and uneven porosity in the finished product. To prevent such blow-by effects, the metered-out amounts of gas or the mass flow, respectively, of the gas for carbon ($CO_2$) particularly preferably lie for example between 0.1 and 0.4 g/h.

In contrast to the known methods and apparatuses, a combination of mixing intensity, dwell time, as well as temperature and pressure is considered in the present invention. The dissolving of the gas preferably takes place via kneading and mixing elements (see FIG. 3), which input little energy into the product, with a simultaneously high distributive and dispersive mixing effect, which is why the apparatus according to the invention preferably comprises at least one screw element with suitable kneading and mixing elements.

Due to the high back-mixing attained by means of a screw element configuration with suitable kneading and mixing elements, a dwell time of between 30s and 300s is already sufficient in an advantageous manner to dissolve a specified amount of gas at a pressure/temperature combination of between 25 and 65 bar and between 20 and 30° C. Compared to the extrusion under overcritical conditions, this approach is advantageous from a safety perspective. The gentle temperatures in the case of such subcritical conditions are furthermore advantageous with regard to potential temperature-sensitive dough components, for example as compared to the known method from the U.S. patents (Rizvi), which equals a cooking extrusion.

In contrast to foaming methods, as they are used notoriously in low-viscous dough masses, the present invention differs significantly in that the gas is dissolved and is not only dispersed or finely distributed. Only with the gas dissolution can it be ensured that the desired bubble distribution is created in response to a selective relaxation.

In the case of approaches, in which a dough is mixed with gas without gas dissolution, the bubble size depends on the ratio of destabilizing inertia forces to stabilizing surface forces and can be described by the Weber number. If, in contrast, the gas is present in the dissolved form in the aqueous portion of the dough matrix, the bubble size is substantially by the pressure difference and relaxation rate in consideration of the fluidic conditions. The nucleation or, in other words, the gas bubble formation, respectively, is high relevant, i.e. the step in which microscopically small gas bubbles form. The goal is a uniform formation of the bubbles in large numbers.

In the present invention, the relaxation preferably takes place through a nozzle 25, which is arranged on the end side of the extruder 3, according to FIG. 2. Such a cylindrical nozzle 25 is preferably chosen with an L/D ratio of between 0.2 and 200. Small L/D ratios of between 2 and 30 are chosen even more preferably to attain pressure drop rates of>60 bar/min.

Figure 3:
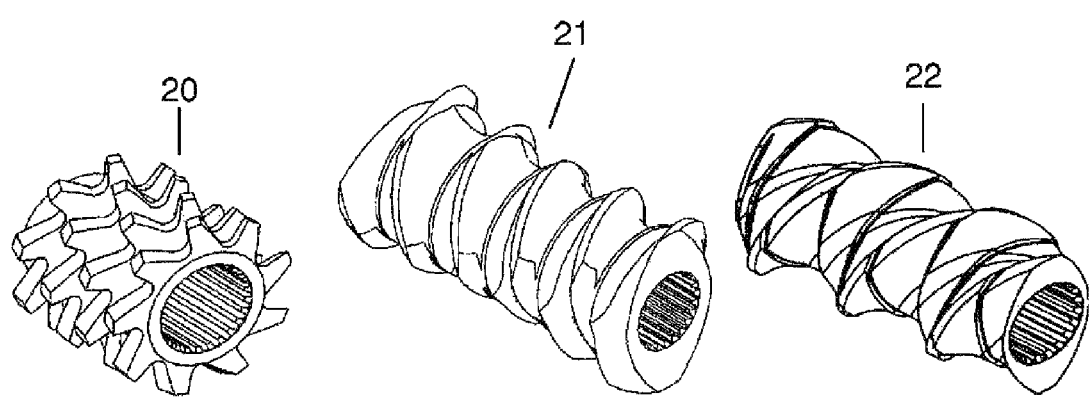
FIG. 3 shows a schematic view of preferred mixing elements of the worm configuration of the preferred embodiment shown in FIG. 2 for the production of foamed doughs.

FIG. 3 shows a schematic view of preferred mixing elements 20; 21; 22 of the screw element configuration of the first preferred embodiment shown in FIG. 2 for the production of the dough-based, foamed food product according to the invention, wherein the dissolving rate is increased by means of the mixing elements 20; 21; 22 shown in FIG. 3, which are to be attached to an eccentric screw (not shown in FIG. 3). The mixing elements 20; 21; 22 shown in FIG. 3 are preferably attached in section 1 of the apparatus according to the invention shown in FIG. 2, in which method step c) takes place. Mixing element 20 is a so-called "Igel" screw (for example from Extricom) comprising such a structure that the dough-based food product matrix is at least partially cut, whereby a distributing (distributive) mixing effect is attained.

Mixing element 21 is a so-called barrier screw (for example from Extricom) comprising such a structure that a distributive mixing is attained. Mixing elements thereby has a barrier section, which provides for an extensional flow of the dough-based food product matrix.

Mixing element 22 is a so-called T-element (for example from Extricom) comprising such a structure that a distributive mixing effect as well as a shifting of the dough-based food product matrix is attained.

It has been discovered in an advantageous manner that less pressure is necessary and that overcritical conditions can be avoided by means of the improved mixing by means of the mixing elements 20; 21; 22.

The resulting mixing increases the diffusion of gas into the dough matrix, so that a single-phase system forms. As a result of the worm element configuration according to FIG. 3, a treatment zone-specific, mechanical treatment of the mass is attained in an advantageous manner in sections 0 to 3. It has been discovered in an advantageous manner that as a result of such a screw element configuration, the specific mechanical energy input into the dough-based food product matrix to be foamed is comparatively low and gentle with values of around 100 kJ/kg.

Figures 4A, 4B, 4C:
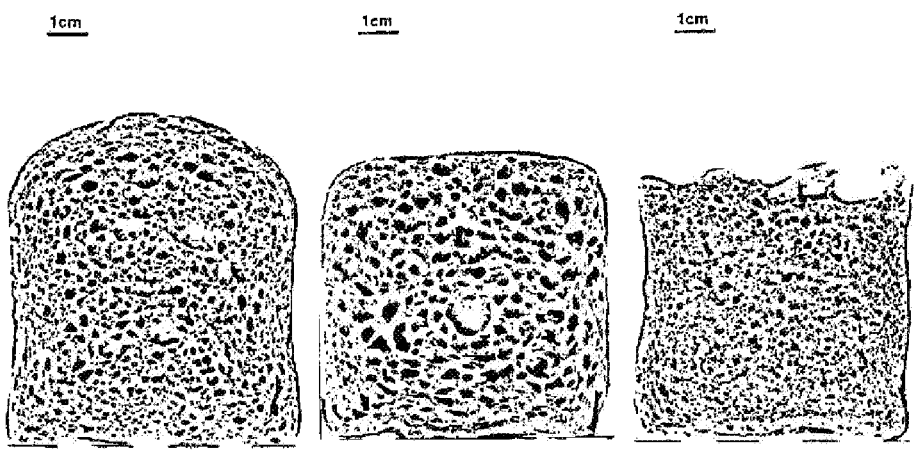
FIGS. 4A, 4B, and 4C show comparative photographs of cross sections through a gluten-containing fresh baked good, which is produced conventionally, a gluten-free fresh baked good, which is produced conventionally, and a gluten-free fresh baked good according to the invention.

As can be seen in FIGS. 4A, 4B, and 4C, dough-based food products, which are traditionally produced in a gluten-free manner, have a comparatively coarsened bubble structure or porosity, respectively, which was created by means of coalescence, as summarized in Table 1, wherein A shows a traditionally produced, gluten-containing fresh baked good, B shows a traditionally produced, gluten-free fresh baked good, and C shows a gluten-free fresh baked good produced according to the invention.

The present invention relates to the selective structuring of foamed dough-based food products and baked goods resulting therefrom. To be able to assess the quality as well as the characteristic, structural properties of the food product according to the invention as compared to conventionally produced baked goods in a relevant manner, the pastry volume, the pore image and the crumb texture, for example, need to be analyzed.

The dough-based food products according to the invention are preferably divided into fresh baked goods and long-life baked goods.

To analyze the pore morphology, the cross section of slices of fresh baked goods are scanned with a resolution of 4800 dpi and are statistically analyzed by means of image processing software (see FIGS. 4A, 4B, and 4C).

In the case of long-life baked goods, the density and the pore morphology are determined by means of microcomputer tomography with a resolution of 7 μm. In addition to porosity, pore size and number are measured as well (see FIG. 5).

The baking volume and the pastry density are determined by means of a volume scanner. The measuring principle of a volume scanner is based on a contact-free distance measurement by means of a laser sensor. The circumference of the pastry is measured along the axis at defined distances. The volume and the density are calculated by means of the measured data (see Tables 1 and 2 below).

The crumb texture of fresh baked goods is determined for example by means of a texture analyzer. Analogous to the defined standard according to AACC 74-09, the firmness (in g or N) of the crumb is analyzed by means of a compression punch (see Table 1 below).

In the case of long-life baked goods (e.g. snacks), the breaking strength is analyzed instead of the crumb firmness as texture parameter by means of a texture analyzer. The breakage behavior of snacks is measured in a compression test by means of 3-point bending apparatus.

The test provides statements with regard to hardness and flexibility of the sample (see Table 2 below).

Table 1 below shows a comparison of a traditionally produced fresh baked good as compared to the gluten-free food product according to the invention, attained by means of the method shown in FIG. 1 and the apparatus according to the invention shown in FIG. 2, using a fresh baked good (bread).

The production of the food product according to the invention shown in Table 1 using the example of bread as fresh baked good by means of an apparatus shown in FIG. 2 in the pilot scale is described in an exemplary manner below:

a) a food product matrix to be foamed is provided in section 0 of the apparatus shown in FIG. 2 at the beginning of the process line P by adjusting the supply device 5 to a mass flow of 4.2 kg/h for the flour and by adjusting the supply device 10 to a mass flow of 4.08 kg/h for the water;

b) in section 1 of the apparatus shown in FIG. 2, the carbon dioxide ($CO_2$) is furthermore introduced into the food product matrix to be foamed as gas G to be dissolved via a gas inlet nozzle 18 comprising a length/diameter ratio L/D of 32, wherein a mass flow of the gas G in the range of 0.1 kh/g is adjusted by means of the flow valve 16, which corresponds to an advantageous adjustment to attain a desired dough density. The measurable pressure of the gas to be dissolved thereby lies in the range of between 30 and 35 bar at the gas inlet nozzle 18;

c) the introduced gas then dissolves in the aqueous portion of the food product matrix to be foamed during a dwell time in the range of 120s at a temperature of 30° C., which is adjusted by means of the temperature control devices 6, and at a pressure of between 30 and 35 bar;

d) gas bubble formation by means of pressure relaxation at the nozzle 25;

e) in an immediately following method step, a foam stabilization takes place by means of baking the attained, foamed, dough-based food product at 200° C. for 30 minutes.

TABLE 1 structure parameters of foamed fresh baked goods in comparison

| Structure parameters | | Unit | Traditional wheat (A) | Traditional gluten-free (B) | Gluten-free according to the invention (C) |
|---|---|---|---|---|---|
| Volume | Volume V | mm³ | | | |
| | Density ρ | g/ml | 312 ± 15 | 365 ± 4 | 310 ± 3 |
| | Overrun OR | % | 203 | 135 | 177 |
| Texture | Breaking Force F | g | 900 | 950 | 300 |
| Pore structure | mean x | μm | 1116 | 1685 | 396 |
| | $x_{10, 3}$ | μm | 330 | 545 | 330 |
| | $x_{50, 3}$ | μm | 870 | 1340 | 750 |
| | $x_{90, 3}$ | μm | 2220 | 3330 | 2060 |
| | span Sp | — | 2.17 | 2.08 | 2.3 |
| | cell density #/mm³ | mm⁻³ | | | |
| | porosity | — | 0.67 | 0.57 | 0.64 |

The production of the food product according to the invention shown in Table 2 using the example of pretzel sticks (snack product) as long-life baked good in the pilot scale will be described below in an exemplary manner:

a) a food product matrix to be foamed is provided in section 0 of the apparatus shown in FIG. 2 at the beginning of the process line P by adjusting the supply device 5 to a mass flow of 4.75 kg/h for the flour and by adjusting the supply device 10 to a mass flow of 3.25 kg/h for the water;

b) in section 1 of the apparatus shown in FIG. 2, the carbon dioxide ($CO_2$) is furthermore introduced into the food product matrix to be foamed as gas G to be dissolved via a gas inlet nozzle 18 comprising a length/diameter ratio L/D of 32, wherein a mass flow of the gas G in the range of 0.1 kh/g is adjusted by means of the flow valve 16, which corresponds to an advantageous adjustment to attain a desired dough density. The measurable pressure of the gas to be dissolved thereby lies in the range of between 27 and 32 bar at the gas inlet nozzle 18;

c) the introduced gas then dissolves in the aqueous portion of the food product matrix to be foamed during a dwell time in the range of 120s at a temperature of 20° C., which is adjusted by means of the temperature control devices 6, and at a pressure of between 27 and 32 bar;

d) gas bubble formation by means of pressure relaxation at the nozzle 25 with an L/D ratio of 22;

e) in an immediately following method step, a foam stabilization takes place by means of baking the attained, foamed, dough-based food product at 200° C. for 7 minutes.

TABLE 2 structure parameters of foamed long-life baked goods in comparison

| Structure parameters | | Unit | No foaming (C) | Foaming (D) |
|---|---|---|---|---|
| Volume | Volume V | mm³ | | |
| | Density ρ | g/ml | 825 ± 10 | 717 ± 315 |
| | Overrun OR | % | | |
| Texture | Breaking Force F | N | 36 ± 15 | 17 ± 5 |
| Pore structure | mean x | μm | 205 | 189 |
| | $x_{10, 3}$ | μm | 30 | 52 |
| | $x_{50, 3}$ | μm | 211 | 182 |
| | $x_{90, 3}$ | μm | 344 | 318 |
| | span Sp | — | 1.49 | 1.46 |
| | cell density #/mm³ | mm⁻³ | 411 | 592 |
| | porosity | — | 0.34 | 0.53 |

Figure 5:
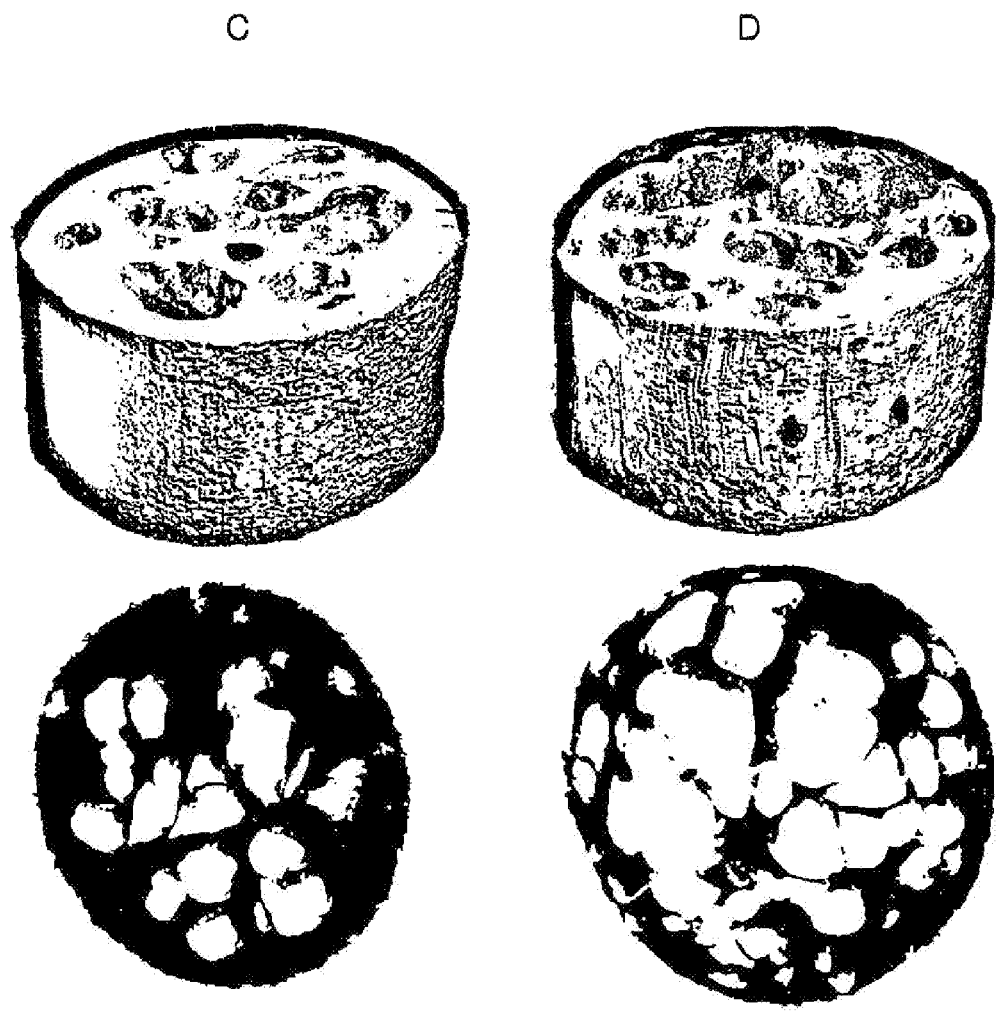
FIG. 5 shows a μ-computer tomographic image of a pretzel stick as food product according to the invention.

FIG. 5 shows a μ-computer tomographic image of a long-life baked good of the dough-based food product according to the invention.

A possible production method will be described hereinafter in an exemplary manner by means of the method steps a) to e) shown in FIG. 1 using a pressure container, which can be closed in a pressure-tight manner, in particular a cream maker:

A dough-based food product matrix to be foamed comprising a proportion by weight of a starch-containing raw material, in particular a gluten-free cereal flour, as well as between 1 and 1.8 proportions by weight of water is provided in method step a) and is added into the pressure container, which can be closed in a pressure-tight manner.

In particular carbon dioxide ($CO_2$) and/or noxious gas ($N_2O$) is introduced into the food product matrix to be foamed in a subsequent method step b) by means of a gas cartridge in terms of a supply device for supplying a gas in the subcritical state.

The introduced gas is dissolved under pressure in the aqueous portion of the dough-based food product matrix in the subsequent method step c), wherein a mixing of the raw material containing water and starch and simultaneously a dissolving of the gas in the aqueous portion of the dough-based food product matrix is attained by shaking the pressure container. The shaking of the pressure container can take place by hand or for example by means of a vortex mixer or the like.

By actuating a relaxation nozzle, which is arranged in a discharge area of the container, which can be closed in a pressure-tight manner, for the discharge of the dough-based food product matrix, an escape of the dough-based food product matrix is attained in method step d), wherein a gas bubble formation is induced and a foamed food product matrix is created by means of the pressure relaxation, which occurs thereby. The created, foamed food product matrix can for example be poured into a suitable baking mold in method step d).

A foam stabilization is attained, and the dough-based, foamed food product is thus attained by means of a baking process in a further method step e).

The attained, foamed and gluten-free food product displays average pore diameters of 500 μm with an even pore image. A bread density of 360 g/l was furthermore attained, which surprisingly lies close to a conventional, yeast-loosened, gluten-containing wheat bread (200-350 g/l). In other words, a foamed, dough-based food product or baked good, respectively, which satisfies the high demands on the structure and pore characteristic, is attained by means of this method according to the invention, independent from the gas retention capacity.

LIST OF REFERENCE NUMERALS 1 control unit
2 drive unit (extruder)
3 extruder
5 supply device for supplying a starch-containing raw material
6 temperature control device
10 supply device for supplying liquid (water)
11 eccentric screw pump
15 supply device (gas)
16 flow valve
17 gas pressure container
18 gas inlet nozzle
20 mixing element
21 mixing element
22 mixing element
25 nozzle (end side to the extruder)
G gas
P process direction (extruder)
R raw material (containing starch)
S segments
W water

The invention claimed is:

1. A method for the production of a foamed, dough-based gluten-free food product, the method comprising:
　a) providing a food product matrix to be foamed, comprising a proportion by weight of a starch-containing, gluten-free raw material and a proportion by weight of water in order to provide a food product matrix with an aqueous portion,
　b) introducing a gas into the aqueous portion of the food product matrix to be foamed,
　c) dissolving the gas under pressure in the aqueous portion of the food product matrix to be foamed,
　d) forming gas bubbles by controlled pressure relaxation so as to increase a volume of the food product matrix with a resulting reduction in density of the food product matrix as a result of bubble growth so as to form a foamed food product matrix, the controlled pressure relaxation being at a pressure drop rate of >60 bar/min and producing a uniform and even gas bubble distribution in the foamed food product matrix,
　e) stabilizing the foam of the foamed food product matrix by heat-induced solidification so as to form the foamed, dough-based gluten-free food product, wherein steps b) and c) are carried out by an extruder,
　the gas is introduced and dissolved in a subcritical state at a pressure of 10 bar≤p<critical pressure of the gas in at least one of method step b) and method step c),
　at least one screw element within the extruder mixes the gas with the food product matrix in method step c),
　the gas dissolves in the aqueous portion of the food product matrix to be foamed during a dwell time of between 100s and 150s in at least one of method step b) and method step c), and
　step e) immediately follows step d).

2. The method according to claim 1, wherein carbon dioxide ($CO_2$) or nitrous oxide gas ($N_2O$) is introduced as the gas in its subcritical state in at least one of method step b) and method step c).

3. The method according to claim 2, wherein carbon dioxide ($CO_2$) is introduced as the gas at a pressure of 25<p<65 bar and a temperature of <31° C. in at least one of method step b) and method step c).

4. The method according to claim 1, wherein method step c) occurs for a period of time of no more than 120 seconds.

5. The method according to claim 1, wherein an amount of the gas is between 0.05 and 1.5% by weight, based on the food product matrix to be foamed.

6. The method according to claim 1, wherein carbon dioxide ($CO_2$) is introduced as the gas in an amount between 0.05 and 1.5% by weight, based on the food product matrix to be foamed.

7. The method according to claim 1, wherein the gas is introduced with a mass flow rate of between 0.1 and 0.4 g/h.

8. The method according to claim 1, wherein carbon dioxide ($CO_2$) is introduced as the gas at a mass flow rate of between 0.1 and 0.4 g/h.

9. The method according to claim 1, wherein the controlled pressure relaxation takes place through a nozzle with a length/diameter ratio of between 2 and 30 so as to attain the pressure drop rate of >60 bar/min.

10. The method according to claim 1, wherein method steps b) and c) are performed at a temperature of 20-30° C.

11. A method for the production of a foamed dough gluten-free food product, the method comprising:
　a) providing a food product matrix comprising a proportion by weight of a starch-containing, gluten-free raw material and a proportion by weight of water such that the food product matrix has an aqueous portion,
　b) dissolving a gas under pressure in the aqueous portion of the food product matrix, the gas being in a subcritical state at a pressure of 10 bar<p<critical pressure of the gas, and dissolving in the aqueous portion of the food product matrix during a dwell time of no more than 150s,
　c) forming gas bubbles through a controlled pressure relaxation so as to increase a volume of the food product matrix with a resulting reduction in density of the food product matrix as a result of bubble growth that forms a foamed food product matrix, the controlled pressure relaxation being at a pressure drop rate of >60 bar/min and producing a uniform and even gas bubble distribution in the foamed food product matrix,
　d) stabilizing the foam of the foamed food product matrix by heat-induced solidification so as to form the foamed dough gluten-free food product,
　wherein step b) is carried out by an extruder, with at least one screw element within the extruder mixing the gas with the food product matrix.

12. The method according to claim 11, wherein the dwell time is no more than 120 seconds.

13. The method according to claim 11, wherein step b comprises introducing the gas in an amount of between 0.05 and 1.5% by weight, based on the food product matrix.

14. The method according to claim 11, wherein step b comprises introducing the gas at a mass flow rate of between 0.1 and 0.4 g/h.

15. The method according to claim 11, wherein the controlled pressure relaxation takes place through a nozzle with a length/diameter ratio of between 2 and 30 so as to attain the pressure drop rate of >60 bar/min.

16. The method according to claim 11, wherein step b) is performed at a temperature of 20-30° C.

* * * * *